United States Patent [19]

Cheesman et al.

[11] Patent Number: 5,326,460
[45] Date of Patent: Jul. 5, 1994

[54] PRETENSIONED MESH INSERT AND METHOD FOR PRODUCING A PRETENSIONED MESH INSERT

[75] Inventors: Robert R. Cheesman, Waukesha; Michael D. Quick, North Prairie, both of Wis.

[73] Assignee: Envirex Inc., Waukesha, Wis.

[21] Appl. No.: 16,005

[22] Filed: Feb. 10, 1993

[51] Int. Cl.$^5$ .......................................... B01D 33/333
[52] U.S. Cl. ................................. 210/160; 210/335; 210/400; 210/499; 29/163.8; 29/525.1
[58] Field of Search ............. 210/160, 335, 356, 488, 210/499, 400, 359, 489; 29/163.8, 525.1

[56] References Cited

U.S. PATENT DOCUMENTS

| | | | |
|---|---|---|---|
| 1,910,860 | 5/1933 | Sayers | 210/160 |
| 2,765,923 | 11/1956 | Novak | 210/499 |
| 3,684,091 | 8/1972 | Wehner | 209/403 |
| 3,900,628 | 8/1975 | Stewart | 428/134 |
| 4,199,456 | 4/1980 | Cheesman | 210/232 |
| 4,302,331 | 11/1981 | Condit, Jr. | 210/160 |
| 4,443,126 | 4/1984 | Strow et al. | 403/24 |
| 4,541,930 | 9/1985 | Heidler et al. | 210/344 |
| 4,582,601 | 4/1986 | Strow et al. | 210/161 |
| 4,634,535 | 1/1987 | Lott | 210/780 |
| 5,015,383 | 5/1991 | Evans et al. | 210/499 |

FOREIGN PATENT DOCUMENTS 612987 5/1935 Fed. Rep. of Germany .
923570 4/1982 U.S.S.R. .

OTHER PUBLICATIONS

Envirex Inc. Bulletin 315–331, Entitled: "Rex water intake screens"; 1989.

*Primary Examiner*—Christopher Upton
*Attorney, Agent, or Firm*—Michael, Best & Friedrich

[57] ABSTRACT

The invention includes a pretensioned mesh insert and method for providing a pretensioned mesh insert for a traveling water screen basket. First and second mated screen panels are secured together to place one of the screen panels under tension and the other of the screen panels under compression so that it bows outwardly from the screen under tension. The structure of the invention operates to reduce the fatigue experienced by the screen panels.

20 Claims, 4 Drawing Sheets

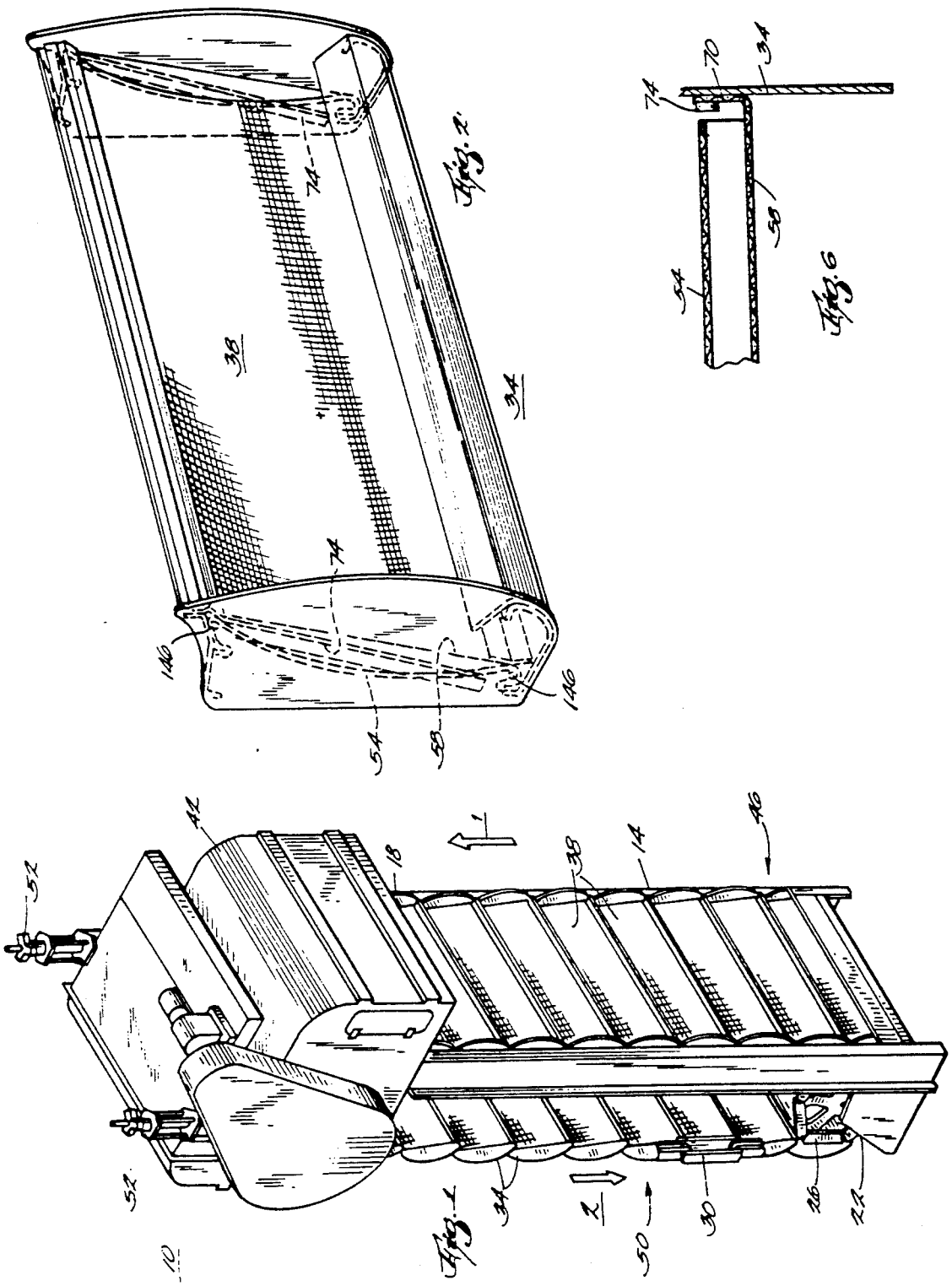

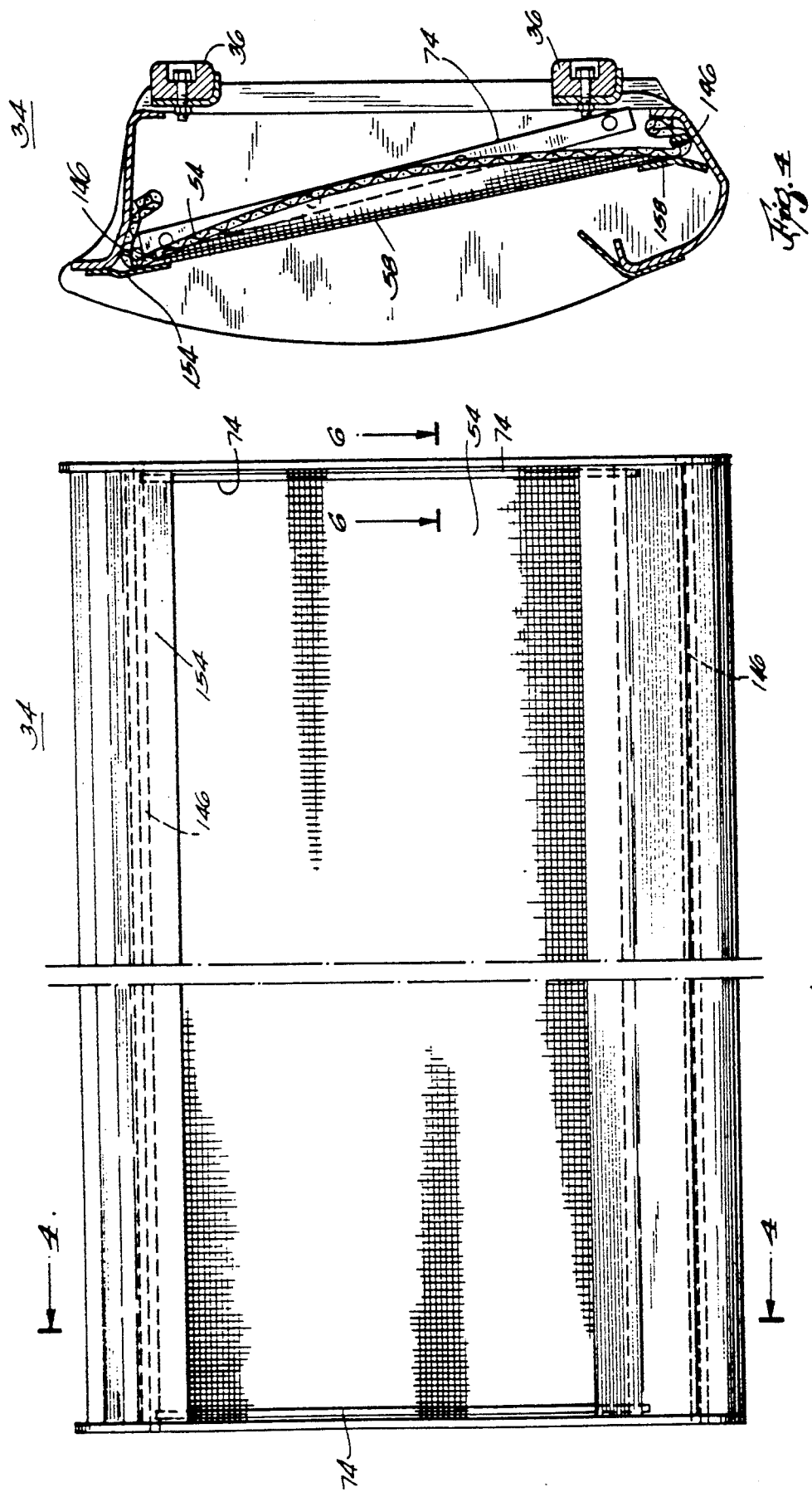

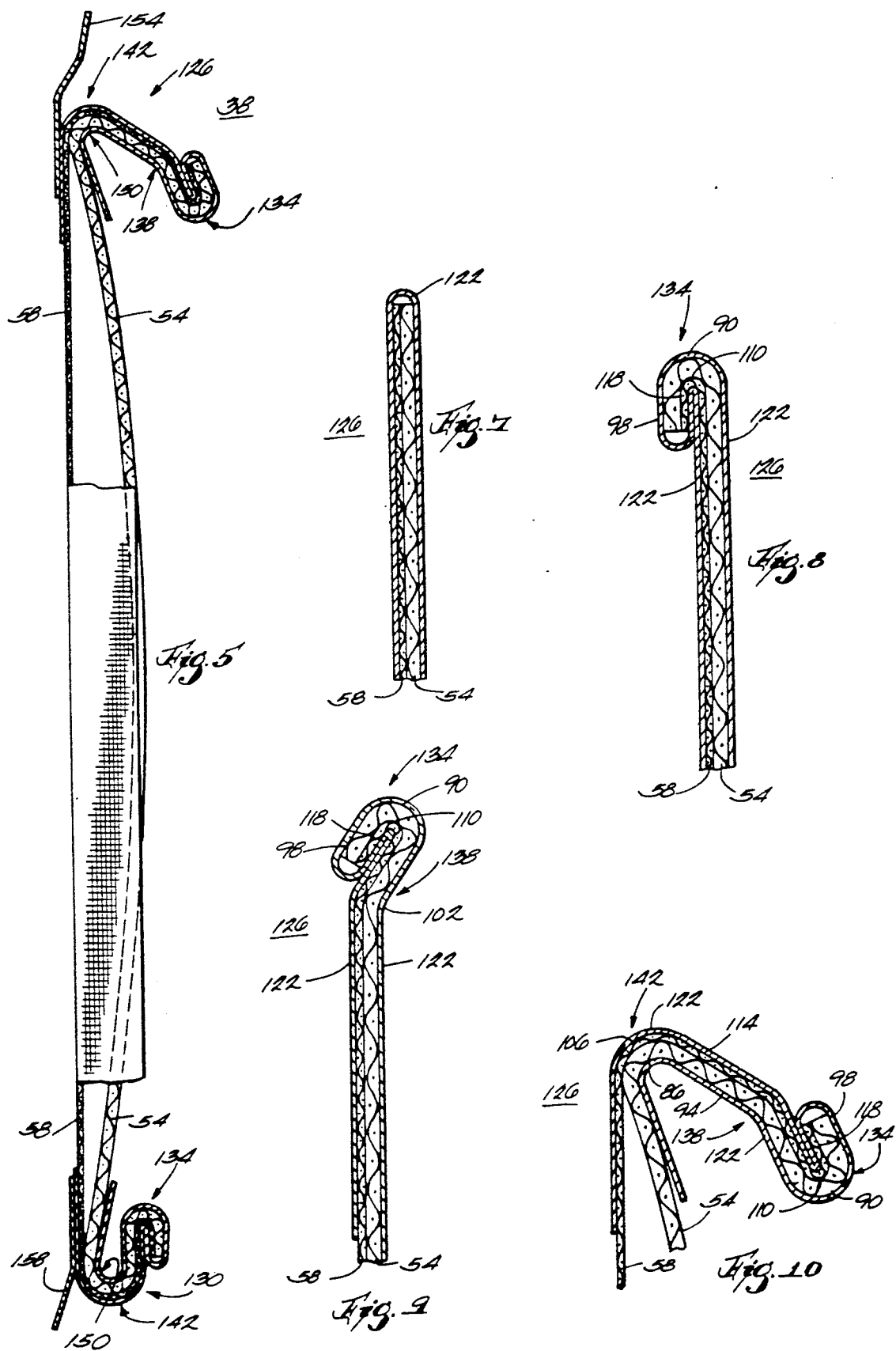

PRETENSIONED MESH INSERT AND METHOD FOR PRODUCING A PRETENSIONED MESH INSERT

BACKGROUND OF THE INVENTION

The invention relates to a traveling water screen basket. More particularly, the invention relates to a pretensioned mesh insert for a traveling water screen basket and a method for producing the pretensioned mesh insert.

Power plants, foundries, and other types of factories are often located near a body of water in order to satisfy their critical need for water, which is typically used as a coolant. However, water taken from a natural source must be filtered to prevent naturally occurring debris and aquatic life from being taken in with the water. The filtering process is designed both to preserve the existing aquatic life and to remove from the water anything that might damage the equipment in the plant or factory.

Typically, traveling water screen through-flow filtration units are used to accomplish the desired filtering. The units are placed in the water reservoir in front of the plant intake ports and include a series of "baskets" mounted on an endless carrier chain assembly. The baskets each include an assembly of screens through which water from the reservoir passes on its way to the intake parts. The screens operate to filter the water and are attached to a frame called a basket. The basket includes a lip used to collect debris from the water. The carrier chain is driven by an electric motor causing the baskets on the upstream or ascending side of the unit to travel upward. As the baskets exit the water, they pass through a splash housing where they are cleaned. The baskets then follow the carrier chain to the downstream or descending side of the unit to repeat the cycle in endless loop fashion.

As already mentioned, each basket includes a screen assembly mounted thereon to accomplish the filtering task. The screens known in the prior art are simply bolted to the baskets themselves or to some type of supporting frame which is then attached to the basket. When a selected screen is on the upstream side of the unit, water flowing through the upstream or filter side of the screen creates a first force on the screen from a first direction. This force causes the screen to deflect a given distance in the first direction from its resting non-tensioned position placing the screen in tension and placing stress on the screen at its point of contact with the frame or basket. The carrier chain assembly then moves the water screen baskets out of the water through the splash housing to the descending side of the unit. When this occurs, the pressure is relieved allowing the mesh to flex back to a resting state. When the screen is again submerged on the descending side, water flows through the screen in a relative direction opposite to the flow through the screen when the screen is on the ascending side. The reversed orientation of the screen causes the flowing water to place a force on the screen in a direction opposite to that existing on the ascending side of the unit. This reversal of the force vector causes the screen to move from the point of deflection experienced on the ascending side of the unit through the resting non-tensioned position to the point of deflection in the opposite direction where the screen is again forced into tension and again placing stress on the screen at the point of contact with the frame. The constant series of transitions from deflection in one direction to deflection in the opposite direction and vice versa causes the material comprising the screens to fatigue quickly at the point of contact between the frame and the screen. This causes the screen to fracture and bend away from the frame resulting in the introduction of debris into the cooling water used in the plant or factory. The degree of fatiguing is at least in part related to the degree of travel from deflection in one direction to deflection in the other direction.

A need exists for a screen for a traveling water basket that substantially eliminates the degree of travel during deflection resulting from the force of water in either direction as the screen passes through a cycle of the carrier chain assembly to prevent premature fracture.

SUMMARY OF THE INVENTION

The invention provides a pretensioned mesh insert for a traveling water screen basket. The mesh insert includes first and second mated screen panels having openings therein providing substantially equivalent through-flow volumes and corresponding first and second side and end edges. The edges are secured together to place one of the screen panels under tension and the other of the screen panels under compression. In the preferred form of the invention, the screen panel under compression bows outwardly from the screen panel under tension.

The construction of the mesh insert embodying the invention places the screens in constant tension thereby substantially eliminating the degree of deflected travel resulting from tension caused by water flowing through the screen from alternating opposite directions. The screen in tension is always in tension and the screen in compression is always in compression. In this manner, the amount of fatigue and frequency of failure endemic to conventional traveling water screens is greatly reduced.

The invention further provides a method of producing the pretensioned mesh insert for a traveling water screen basket. The method requires overlaying the first and second screen panels and establishing a fold line on each of the margins spaced adjacent each of the side edges. The side margins of the first one of the screen panels are then aligned in overlaying relation to the side margins of the second one of the screen panels. The first and second side margins are then secured together. The side margins are then bent on the fold lines to place one of the panels under tension and cause the other of the panels to be subjected to compressive forces sufficient to cause the compressed panel to bow relative to the panel under tension.

BRIEF DESCRIPTION OF THE DRAWINGS

FIG. 1 is a perspective view of an intake through-flow unit including the traveling water screen baskets for mounting the pretensioned mesh inserts.

FIG. 2 is a perspective view of one traveling water screen basket including the pretensioned mesh insert of the invention.

FIG. 3 is a front elevational view of the basket of FIG. 2.

FIG. 4 is a view taken along line 4—4 in FIG. 3.

FIG. 5 is a side elevational view of the pretensioned mesh insert with portions cut-away.

FIG. 6 is a view taken along lines 6—6 in FIG. 3.

FIG. 7 is an enlarged partial cross-section showing the overlaid screen panels and the sheath before bending.

FIG. 8 is a view similar to FIG. 7 showing the first bend.

FIG. 9 is a view similar to FIG. 8 and including a tapering crease adjacent the first bend.

FIG. 10 is a view similar to FIG. 9 and including the second bend.

DETAILED DESCRIPTION OF THE PREFERRED EMBODIMENT

Figure 11:
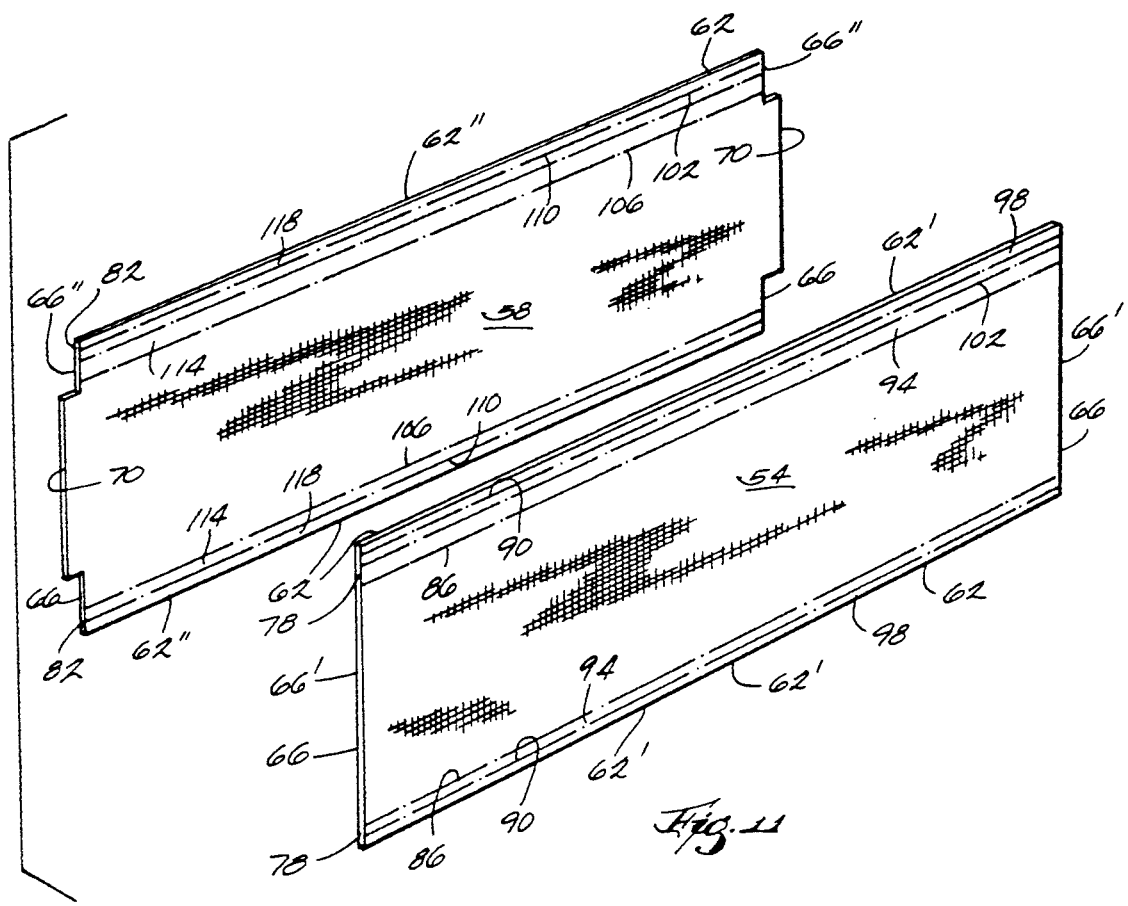
FIG. 11 is an exploded perspective view of the fine mesh screen and the coarse mesh screen.

Illustrated in FIG. 1 of the drawings is a conventional through-flow unit 10 including a main frame 14 having upper and lower ends 18, 22. Each end supports a shaft (not shown) which has a sprocket assembly 26 mounted thereon. A pair of carrier chain assemblies 30 (only one of which is partially shown) are trained around the sprockets 26 for supporting a plurality of individual traveling water screen baskets 34. Each basket includes support means 36 (shown only in FIG. 4) for connecting the basket to the chain assembly 30 and is adapted to support a water screen insert 38 for filtering debris and aquatic life from water flowing through the screen.

Also included in the through-flow unit 10, is a splash housing 42 through which the traveling water screen baskets 34 and screen assemblies 38 must pass in order that the collected debris can be effectively cleaned off of the screens. On the upstream or ascending side 46 of the through-flow unit 10, the chain assembly 30 carries the baskets in ascending relation (shown by arrow 1) to the splash housing 42. Upon exiting the splash housing, the chain assembly carries the baskets in descending relation (shown by arrow 2) along the downstream or descending side 50 of the through-flow unit. Also, mounted on the splash housing 42 are a pair of adjusting nuts 52 for adjusting the tension of the chain assemblies 30.

Shown in FIG. 2 of the drawings is a perspective view of one traveling water screen basket 34 including the pretensioned mesh insert 38 of the invention. The pretensioned mesh insert comprises first and second overlaid screen panels 54, 58 designed to allow water to flow through the screen panels at substantially equivalent volumes. While the actual resistance to flow of the individual screen panels may differ somewhat, it is to be understood that the volume of flow through the screen panels is generally equivalent.

The overlaid screen panels 54, 58 are each generally rectangular and each includes spaced apart longitudinal side edges 62 and end edges 66 (shown in FIG. 11). Fastening means are provided for securing the side edges 62 together to place one of the screen panels 58 under tension and the other of the screen panels 54 under compression in the following manner.

The pretensioned mesh insert 38, as previously mentioned, includes first and second screen panels 54, 58. The panels each have approximately equivalent widths and lengths so that they may be laid one over the other or mated in corresponding relation to each other. The screens may be made of any suitable material such as plastic, nylon, suitable metals, etc., with one of the screens having a property which will allow it to bow when subjected to compression. In one form of the invention, the screens can be stainless steel. The first screen panel 54 is a coarse mesh screen that is made of a heavier gauge material, is relatively rigid and strong, but capable of bowing when compressive forces are applied to its spaced apart side edges. The coarse mesh screen is cut to form a rectangle having longitudinally extending first side edges 62' and shorter first end edges 66' (shown in FIG. 11).

The second screen panel 58 is a finer mesh screen that, relative to the coarse mesh screen, is made of a lighter gauge material that is less rigid and less strong. The fine mesh screen 58 is cut substantially in the form of a rectangle to match the rectangle of the coarse mesh screen 54. Accordingly, the fine mesh screen 58 has longitudinally extending second side edges 62" equivalent to the first side edges 62' of the coarse mesh screen 54. Unlike the coarse mesh screen 54, the fine mesh screen 58 has second end edges 66" that include a tab-like extension 70 adapted to be fixed to the frame of the traveling water basket 34 by a bracket 74, best shown in cross-section in FIG. 6.

As best seen in FIG. 11, the first and second mated screens 54, 58 also include first and second respective longitudinally extending fold lines 86, 90 and 106, 110 spaced from the respective first and second side edges 62', 62" to define spaced apart respective first and second margins 78, 82 adjacent the first and second side edges 62', 62". Explaining in greater detail, the first fold lines include first inner and outer spaced apart fold lines 86, 90 on the first margins 78. These first inner and outer spaced apart fold lines divide the first margins into first inner and outer borders 94, 98. Likewise, the second longitudinally extending fold lines include second inner and outer spaced apart fold lines 106, 110 on the second margins 82 which divide the second margins 82 into second inner and outer borders 114, 118. Also included adjacent one of each pair of first and second side edges 62', 62" is a taper line 102 the importance of which will be described below.

The first margins 78 of the first screen panel 54 are superimposed to overlay the second margins 82 of the second screen panel 58 to place the first and second fold lines 86, 90 and 106, 110, respectively, in register with one another.

The margins 78, 82 are then clamped together to secure the first and second screens against movement relative to each other during the bending of the screens. Any suitable clamping means may be employed. In one form of the pretensioned mesh insert, the fastening means includes a sheet metal sheath 122 (FIGS. 7-10) that encompasses the overlaying side edges 62 of the mated screen panels 54, 58. The sheath 122 operates to temporarily secure the first and second margins 78, 82 relative to each other and also to provide a malleable base for the subsequent bending of the edges which will be discussed in greater detail below.

The pretensioned mesh insert 38 further comprises a series of bends at the fold lines along each of the overlaid side edges. As shown in FIG. 5, the final bends combine to form a s-shaped cross section along the leading side 126 and trailing side 130 of the mesh insert. Though the particular cross sectional dimensions of the two side edges are different, the structure, function and process of bending both side edges is substantially similar. Accordingly, only the bending of the leading side edge assembly 126 (FIGS. 7-10) is shown and described in detail.

Referring first to FIG. 8, the first or outer bend 134 is formed along the outer fold lines 90, 110 which define the outer borders 98, 118 of the margins 78, 82. The margins, including the fine mesh screen 58, coarse mesh screen 54 and sheet metal sheath 122, are folded in a first direction as shown in FIG. 8 so that the first and second outer borders 98, 118 overlay the first and second inner borders 94, 114. In one form of the invention, this bend can be made very tight to bring the outer and inner borders in register with one another thereby preventing relative movement between the screen panel margins 78, 82.

As shown in FIG. 9, a crease 138 is formed along taper line 102 to form fit the leading side edge assembly 126 to the traveling water screen basket 34. Referring now to FIG. 10, a second or inner bend 142 is also formed along the inner fold lines 86, 106 partially defining the inner borders 94, 114. As shown in FIG. 10, the second bend 142 is formed in a direction opposite to the first bend 134. This second bend 142 can be completed only after the first bend 134 is completed on both the leading and trailing sides 126, 130, respectively of the pretensioned mesh insert 38. Rather than being a tight bend like the first bend 134, the second bend 142 is made over a wide radius i.e., includes a large arcuate region. The wide arc causes the fine mesh screen 58 to turn a larger radius about the focal point of the bend than does the coarse mesh screen 54. Because both of the outer bends 134 of the screen edge assemblies 126, 130 are made before either of the inner bends 142, the screens are fixed relative to each other at the outer borders 98, 118, but not between the inner borders 94, 114. As a result, adjustment between the screens 54, 58 to accommodate for the difference in the length of travel of the individual screens relative to each other must occur between the inner borders 94, 114 of the screens. The adjustment places the fine mesh screen 58 in tension while the coarse mesh screen 54 is simultaneously placed in compression. This action causes the coarse mesh screen 54 to bow outwardly, away from the fine mesh screen 58. The wide radius of the second bend 142 also provides an arcuate portion or lip 150 along each of the side edge assemblies 126, 130 for receiving a mounting rod 146 (on each on the leading and trailing side edge assemblies 126, 130) attached to the traveling water basket 34 (see FIGS. 2 and 4). Each side edge assembly 126, 130 of the pretensioned mesh insert is simply fitted around the corresponding mounting rod 146 so that the mounting rod is received within the inner arcuate portion 150 of the bends.

With reference to FIGS. 4 and 5, the pretensioned mesh insert 38 also includes a pair of longitudinally extending sheet metal sealing strips 154, 158 for providing a seal in the interface regions 160 existing between the longitudinal edges of the pretensioned mesh insert and the adjacent frame 162 of the traveling water baskets 34. The seal prevents the introduction of debris that might otherwise slip between the screens and the basket from being introduced into the intake port. The sealing strips 154, 158 may be attached using any suitable means and are each individually designed to seal both the leading and trailing interface regions 160 of each water basket 34.

The invention also provides a method for producing the pretensioned mesh insert 38 for a traveling water screen basket 34. The method of producing the pretensioned mesh insert comprises the steps of: placing the first and second mated screen panels 54, 58 in face to face relation so that the first and second side edges 62', 62" of the first and second screen panels, and the first and second end edges 66', 66" of the first and second screen panels are generally aligned; establishing a pair of fold lines 86, 90 and 106, 110 on each of the margins 78, 82, respectively, adjacent each of the side edges 62', 62"; aligning the side margins 78 of the first screen panel 54 in overlaying relation to the side margins 82 of the second screen panel 58; securing the side margins 78, 82 are together; and bending on the fold lines to place one of the panels 58 under tension and cause the other of the panels 54 to be subjected to compression forces sufficient to cause the compressed panel to bow outwardly relative to the panel under tension. The fold lines 86, 90 and 106, 110 may be established in any such way that results, when the screens are bent along the fold lines, in the creation of a structure wherein the fine mesh screen panel 58 is placed under tension and the coarse mesh screen panel 54 is placed under compression so that the coarse mesh screen panel bows outwardly relative to the fine mesh screen panel. In the embodiment shown in the drawings, a pair of spaced parallel fold lines are established on each of the side margins 78, 82 and the bending takes place on the spaced parallel fold lines to form longitudinal side edges on the mesh insert each having an s-shaped cross section as shown in the drawings. Alternatively, the second or inner bend 142 may be established to create a cross-section in which the lip 150 is generally perpendicular to the portion of the fine mesh screen in tension and is parallel to the direction of water travel through the screen.

Various features of the invention are set forth in the following claims.

What is claimed is:

1. A method of producing a pretensioned mesh insert for a traveling water screen basket comprising the steps of:
   A. placing first and second panels together in face-to-face relation such that the screen panels have adjacent side edges, end edges, and first and second side margins adjacent said side edges;
   B. establishing a pair of parallel fold lines on each of said margins and spaced inwardly from each of said side edges;
   C. aligning said side margins of said first one of said screen panels in overlaying relation to said side margins of said second one of said screen panels;
   D. securing said first and second side margins together; and
   E. bending said side margins on said parallel fold lines to place one of said panels under tension and cause the other of said panels to be subjected to compressive forces sufficient to cause said compressed panel to bow relative to said panel under tension and to form longitudinal side edges on said mesh insert each having an S-shaped cross-section.

2. A pretensioned mesh screen insert for a traveling water screen basket, the pretensioned mesh screen insert comprising:
   first and second overlaid screen panels having opposite edges, the edges being secured together such that one of the screen panels is under tension between the edges and defines a plane, and such that the other of the screen panels is under compression between the edges, the screen panel under compression being bowed relative to the panel under tension so as to form a smooth curve extending from one of the edges to the other of the edges.

3. A pretensioned mesh screen insert as set forth in claim 2 wherein the screen panels are clamped together along the opposite edges and wherein the screen panels are bent along a line generally parallel to one of the opposite edges and spaced inwardly from that one of the opposite edges.

4. A pretensioned mesh screen insert as set forth in claim 3 wherein the screen panels are bent along a line generally parallel to the other of the opposite edges and spaced inwardly from the other of the opposite edged and wherein the pretensioned mesh screen insert includes means for mounting the pretensioned mesh screen insert in a traveling water screen basket.

5. A pretensioned mesh screen insert as set forth in claim 2 wherein the panel under tension comprises a fine mesh screen panel and the panel under compression comprises a coarse mesh screen panel.

6. A pretensioned mesh screen insert as set forth in claim 2 wherein the screen panels include opposite first bends at each of the opposite edges to join the edges of the panels together and opposite second bends spaced inwardly from the respective first bonds.

7. A pretensioned mesh screen insert as set forth in claim 6 wherein the first bends have a first bend radius, and the second bends having a second bend radius greater than the first bend radius.

8. A pretensioned mesh screen insert as set forth in claim 2 wherein the edges are bent in one direction about a first line to join the edges together and wherein the joined edges are bent in an opposite direction and about a second line spaced inwardly from the first line.

9. A traveling water screen basket for use in a traveling water screen, the traveling water screen basket comprising:

spaced apart ends and a pretensioned mesh screen extending between the ends, the pretensioned mesh screen including first and second overlaid screen panels having opposite edges, the edges being secured together, one of the screen panels being under tension between the edges and defining a plane, and the other of the screen panels being under compression between the edges, the screen panel under compression being bowed relative to the panel under tension so as to form a smooth curve extending generally from one of the edges to the other of the edges.

10. A pretensioned mesh screen insert as set forth in claim 9 wherein the screen panels are clamped together along the opposite edges and wherein the screen panels are bent along a line generally parallel to one of the opposite edges and spaced inwardly from that one of the opposite edges.

11. A pretensioned mesh screen insert as set forth in claim 10 wherein the screen panels are bent along a line generally parallel to the other of the opposite edges and spaced inwardly from the other of the opposite edges and wherein the pretensioned mesh screen insert includes means for mounting the pretensioned mesh screen insert in a traveling water screen basket.

12. A pretensioned mesh screen insert as set forth in claim 9 wherein the panel under tension comprises a fine mesh screen panel and the panel under compression comprises a coarse mesh screen panel.

13. A pretensioned mesh screen insert as set forth in claim 9 wherein the mesh screen panels include opposite first bends at each of the opposite edges to join the edges of the panels together and opposite second bends spaced inwardly from the respective first bonds.

14. A pretensioned mesh screen insert as set forth in claim 13 wherein the first bends have a first bend radius, and the second bends have a second bend radius greater than the first bend radius.

15. A pretensioned mesh screen insert as set forth in claim 9 wherein the edges are bent in one direction about a first line to join the edges together and wherein the joined edges are bent in an opposite direction and about a second line spaced inwardly from the first line.

16. A method of making a pretensioned mesh screen assembly for use in a basket of a traveling water screen, the method comprising the steps of:

(A) placing first and second screen panels together in face-to-face relation such that the screen panels have adjacent side edges;

(B) securing the adjacent side edges of the first screen panel to the side edges of the second screen panel to establish a pair of side margins along each of the side edges;

(C) establishing a fold line adjacent at least one of the margins, the fold line being generally parallel to the one of the margins; and (D) folding the one side margin along the fold line to place one of the panels under tension and defining a plane and to place the other of the panels under compression so that the panel under compression is bowed relative to the panel under tension to form a smooth curve extending generally from one of the margins to the other of the margins.

17. A method of making a pretensioned mesh screen assembly as set forth in claim 16 wherein the step (C) includes the steps of establishing an inner fold line and an outer fold line on the one margin.

18. A method of making a pretensioned mesh screen assembly as set forth in claim 17 wherein in the step (A), the screen panel under compression is a coarse mesh screen panel and the screen panel under tension is a fine mesh screen panel.

19. A method of making a pretensioned mesh screen assembly as set forth in claim 18 wherein the step (D) includes the step of folding the one margin along the inner fold line so that the side edges adjacent the one margin face the coarse mesh screen panel.

20. A method of making a pretensioned mesh screen assembly as set forth in claim 19 wherein the step (D) further includes the step of folding the margin along the outer fold line to establish in the margin an S-shaped cross-section.

* * * * *